United States Patent
Kato

[19]

[11] Patent Number: 5,865,160
[45] Date of Patent: Feb. 2, 1999

[54] FUEL SUPPLY SYSTEM FOR OUTBOARD MOTOR

[75] Inventor: Masahiko Kato, Shizuoka, Japan

[73] Assignee: Sanshin Kogyo Kabushiki Kaisha, Japan

[21] Appl. No.: 862,751

[22] Filed: May 23, 1997

[30] Foreign Application Priority Data

May 23, 1996 [JP] Japan ................................. 8-128274

[51] Int. Cl.⁶ ....................................... F02M 37/04
[52] U.S. Cl. ............................... 123/516; 123/514
[58] Field of Search ................... 123/514, 516, 123/198 E, DIG. 2

[56] References Cited

U.S. PATENT DOCUMENTS

| | | | |
|---|---|---|---|
| 3,709,202 | 1/1973 | Brown | 123/DIG. 2 |
| 5,103,793 | 4/1992 | Riese et al. | 123/516 |
| 5,146,901 | 9/1992 | Jones | 123/516 |
| 5,309,885 | 5/1994 | Rawlings et al. | 123/509 |
| 5,363,827 | 11/1994 | Siekmann | 123/509 |
| 5,368,001 | 11/1994 | Roche | 123/510 |
| 5,375,578 | 12/1994 | Kato et al. | 123/516 |
| 5,389,245 | 2/1995 | Jaeger et al. | 123/514 |
| 5,404,858 | 4/1995 | Kato | 123/516 |
| 5,482,021 | 1/1996 | Roche | 123/456 |
| 5,517,963 | 5/1996 | Yoshida et al. | 123/336 |
| 5,535,718 | 7/1996 | Nakai et al. | 123/336 |
| 5,542,388 | 8/1996 | Ichinose et al. | 123/336 |
| 5,546,913 | 8/1996 | Aoki | 123/516 |
| 5,647,331 | 7/1997 | Swanson | 123/516 |
| 5,653,103 | 8/1997 | Katol | 60/283 |

OTHER PUBLICATIONS

Carter Fuel Pumps and Fuel Pump Assemblies Catalogue #3879, Weatherly Index No. 604, 1994, p. 214.

*Primary Examiner*—Thomas N. Moulis
*Attorney, Agent, or Firm*—Knobbe, Martens, Olson & Bear, LLP

[57] ABSTRACT

An outboard motor includes a fuel supply system which minimizes and curbs fuel spillage when the outboard motor is placed in a non-upright position. The fuel supply system includes an internal fuel tank which communicates with at least one intake passage of an engine of the outboard motor via a fuel vapor discharge line. The discharge line extends between a vapor discharge port on the fuel tank and a vapor suction port on the engine. The ports and the discharge line are arranged within the outboard motor to inhibit significant spillage or drainage of liquid fuel from the fuel tank through the vapor discharge line regardless of the orientation of the outboard motor, such as, for example, when the outboard motor is inverted or is laid over on its side.

20 Claims, 9 Drawing Sheets

FUEL SUPPLY SYSTEM FOR OUTBOARD MOTOR

BACKGROUND OF THE INVENTION

1. Field of the Invention

The present invention relates in general to an internal combustion engine, and more particularly to a fuel supply system of an internal combustion engine for an outboard motor.

2. Description of Related Art

Outboard motors are increasingly employing fuel injection systems. Fuel injected engines offer such advantages as improved fuel economy, lower emissions, increased engine power, and better fuel distribution into each engine cylinder.

A conventional fuel injection system typically includes a vapor separator to remove vapor from the fuel supply. The vapor separator typically includes a fuel bowl or tank that is arranged within the cowling of the outboard motor. A float or similar level controller controls the fuel level within the tank. A high pressure pump often delivers fuel from the vapor separator to a fuel rail which in turn feeds the fuel to the fuel injectors. The fuel injectors inject a specific fuel volume into the engine during each combustion cycle. Excess fuel from the fuel rail is returned to the vapor separator.

Some fuel vaporizes within the fuel supply system due to heat and to pressure drops within the circulation loop between the vapor separator and the fuel rail. The vapor separator thus often includes a vapor discharge port to vent fuel vapors from the fuel tank. The fuel vapors are usually introduced into engine to be burnt with the normal fuel-air charge. Prior venting mechanisms, however, have been overly complicated, employing check valves which open only when the vapor pressure exceeds a predetermined value.

SUMMARY OF THE INVENTION

A simplified vent mechanism has been designed which employs a suction port that communicates with at least one intake passage of the engine. A vapor discharge line connects the suction port to a vapor outlet port on the fuel tank. The air flow through the intake passage thus draws the fuel vapor from the fuel tank and into the induction system for burning with the normal fuel charge.

The present invention includes the recognition that although this type of vapor venting mechanism offers a simplified structure, it requires the user to take some step(s) to prevent leakage or drainage of liquid fuel from the internal fuel tank into an induction system of the engine before placing the outboard motor in a non-upright position, such as, for example, on its side. Excess fuel within the induction system when the outboard motor is righted can cause a number of problems, including flooding the engine. A need therefore exists for an equally simply-structured way to automatically inhibit or curb fuel leakage or drainage from the internal fuel tank into the induction system when the outboard motor is placed in a position that exceeds its normal operating positions between an upright position and a full-tilt up position.

Therefore, in accordance with one aspect of the present invention, an outboard motor is provided that comprises an engine. The engine includes an output shaft that rotates about a rotational axis and drives a propulsion device that is located generally below the engine with the outboard motor in an upright position. The engine additionally includes an intake passage and a vapor suction hole that communicates with the intake passage. A valve mechanism establishes a maximum level of fuel within an internal fuel tank. The tank includes a vapor discharge port that lies above the maximum fuel level with the outboard motor in the upright position. A vapor discharge line connects the vapor suction hole on the engine to the vapor discharge port on the fuel tank. The vapor discharge port and the vapor discharge line are arranged relative to the engine such that at least a portion of either the vapor discharge line or the vapor discharge port lies above the fuel level within the tank regardless of the orientation of the outboard motor.

An additional aspect of the present invention involves an outboard motor comprising an engine. The engine is arranged within the outboard motor to have port and starboard sides, fore and aft ends and upper and lower ends. The engine includes an intake passage and a vapor suction hole that communicates with the intake passage. A fuel system supplies fuel to the engine and includes an internal fuel tank positioned within to the outboard motor. The fuel tank has a vapor discharge hole. The vapor discharge hole is positioned to lie above and behind the vapor suction hole, and to one side of vapor suction hole. This arrangement of the discharge and suction holes on the fuel tank and engine, respectively, inhibits fuel drainage from the tank toward the engine when the outboard motor is placed in a position outside of its range of normal operating positions.

Further aspects, features, and advantages of the present invention will become apparent from the detailed description of the preferred embodiment which follows.

BRIEF DESCRIPTION OF THE DRAWINGS

The above-mentioned and other features of the invention will now be described with reference to the drawings of a preferred embodiment of the present fuel supply system. The illustrated embodiment of the fuel supply system is intended to illustrate, but not to limit the invention. The drawings contain the following figures.

DETAILED DESCRIPTION OF THE PREFERRED EMBODIMENT

Figure 1:
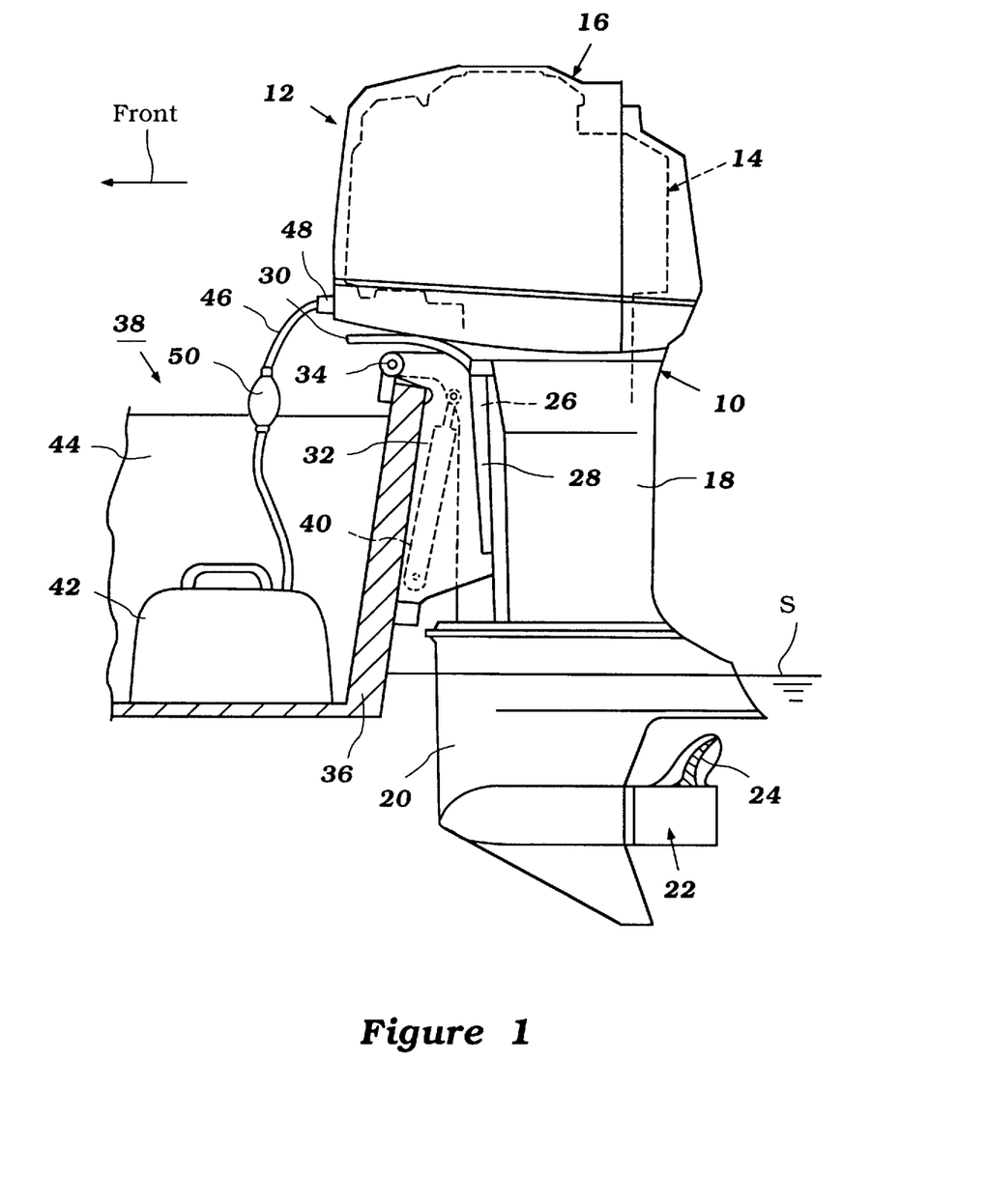
FIG. 1 is a side elevational view of an outboard motor on which the present fuel supply system can be employed.

FIG. 1 illustrates an outboard drive which incorporates a fuel supply system configured in accordance with the preferred embodiment of the present invention. Because the present fuel supply system has particular utility with an outboard motor, the fuel supply system is described below in connection with the outboard motor. However, the description of the invention in conjunction with the illustrated outboard motor is merely exemplary.

The outboard motor 10 has a power head 12 which includes an internal combustion engine 14. A protective cowling 16 surrounds the engine 14.

Figure 2A:
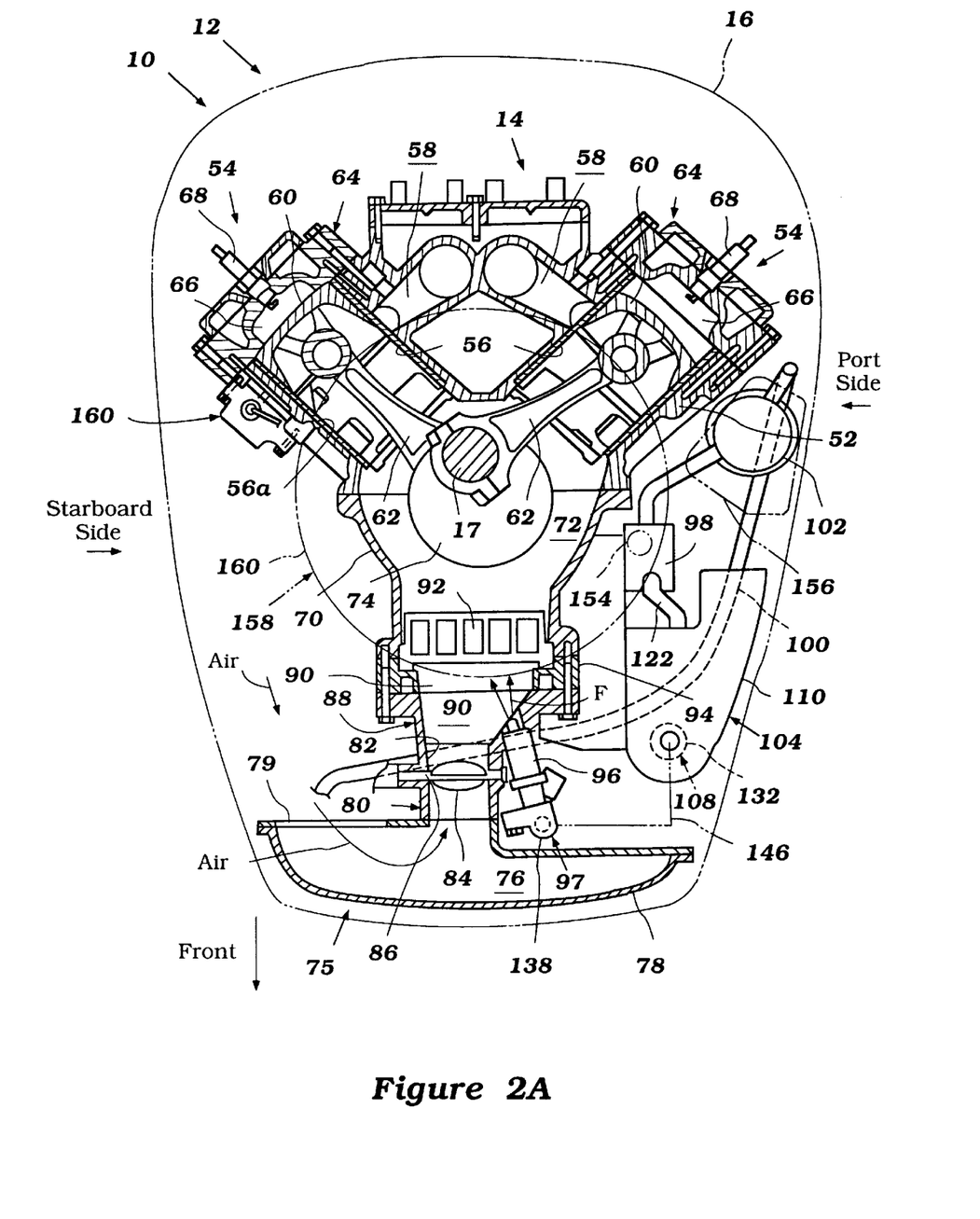
FIG. 2A is a cross-sectional view of the power head of FIG. 1 with a protective cowling of the power head shown in phantom.

As is typical with the outboard motor practice, the engine 14 is supported within the power head 12 so that its output shaft 17 (i.e., a crankshaft as illustrated in FIG. 2A) rotates about a vertical axis. The crankshaft 17 is coupled to a drive shaft 19 (FIG. 3) that depends through and is journalled within a drive shaft housing 18.

The drive shaft housing 18 extends downward from the cowling 16 and terminates in a lower unit 20. The drive shaft 19 extends into the lower unit 20 to drive a transmission (not shown) housed within the lower unit 20. The transmission selectively establishes a driving condition of a propulsion device 22. In the illustrated embodiment, the propulsion device 22 is a propeller having a propeller blade 24. The transmission desirably is a forward/neutral/reverse-type transmission so as to drive the watercraft in any of these operational states.

A steering shaft 26 is affixed to the drive shaft housing 18 by upper and lower brackets. The brackets support the steering shaft 26 for steering movement within a swivel bracket 28. Steering movement occurs about a generally vertical steering axis which extends through the steering shaft 26. A steering arm 30 is connected to an upper end of the steering shaft 26 and extends in a forward direction for manual steering of the outboard motor 10, as known in the art.

The swivel bracket 28 also is pivotally connected to a clamping bracket 32 by a pin 34. The clamping bracket 32, in turn, is configured to attach to a transom 36 of the watercraft 38. The clamping bracket 32 is arranged on the transom 36 at a location which supports the outboard motor 10 in a generally upright position and at a location where the propeller blades 24 of the propeller 22 lies at least partially beneath the surface level S of the body of water in which the watercraft 38 is operated.

The conventional coupling between the swivel bracket 28 and the clamping bracket 32 permits adjustment of the trim position of the outboard motor 10, as well as allows the outboard motor 10 to be tilted up for transportation or storage. For this purpose, a conventional tilt and trim cylinder assembly 40 desirably operates between the clamping bracket 32 and the swivel bracket 28. This conventional mounting thus permits the outboard motor 10 to move within a normal or designed range of positions relative to the transom between a generally upright position (or slightly tilted away from the transom) to a full tilt-up position. This results in about an 80 degree range of movement when installed on the transom (i.e., between normal operating positions).

As seen in FIG. 1, an external fuel tank 42 is located within the hull 44 of the watercraft 38. A fuel line 46 connects the fuel tank 42 to a conventional quick-connect coupling 48 located on the front of the side of the cowling tray. In an illustrated embodiment, the fuel supply system includes a hand pump 50 disposed within the fuel line 46. The hand pump 50 is initially used to prime the fuel supply system.

The construction of the outboard motor 10 as thus far described is considered to be conventional, and for that reason further details of the construction are not believed necessary to permit those skilled in the art to understand and practice the invention.

In order to facilitate the description of the present invention, the terms "front" and "rear" or "aft" are used to indicate the relative sides of the components of the engine and the fuel supply system. As used herein, "front" refers to the side closest to the transom 36, while "rear" or "aft" refer to the side furthest from the transom 36. Several of the figures include labels to further aid the reader's understanding.

FIG. 2A illustrates the fuel supply system in conjunction with a two-cycle, crankcase compression, V-type internal combustion engine as a power unit. Because outboard motors often employ such engines, the fuel supply system is described below in connection with this type of engine 14; however, the description of the invention in conjunction with a two-cycle engine is merely exemplary. The present invention may be applicable to engines having other cylinder arrangements, such as, for example, in-line or slant cylinder arrangements, and operate on other than a two-stroke crankcase compression principal, such as, for example, on a four-cycle principal.

A cylinder block assembly 52 lies generally at the center of the engine 14. The cylinder block 52 includes a pair of inclined cylinder banks 54. The cylinder banks 54 extend at an angle relative to each other to give the engine a conventional V-type configuration.

Each cylinder bank 54 includes a plurality of parallel cylinder bores 56. A cylinder liner finishes each cylinder bore 56. The cylinder liner is cast or pressed in place in the cylinder bank 54. As is typical with V-type engine arrangements, the cylinder bores 56 of the first cylinder bank are offset slightly in the vertical direction from the cylinder bores 56 of the second cylinder bank so that the connecting rods of adjacent cylinders can be journalled on the same throws of the crankshaft 17, as known in the art.

As understood from FIG. 2A, each cylinder includes a plurality of scavenge passages formed in the cylinder block 54. For instance, each cylinder can include a main scavenge passage and a pair of circumferentially disposed side scavenge passages. The scavenge passages terminate in respective scavenge ports formed in the cylinder liner.

An exhaust passage 58 communicates with the cylinder bore 56 through an exhaust port. The exhaust port is formed in the cylinder liner and desirably lies diametrically opposite the main scavenge port and between the side scavenge ports. The arrangement of the ports is desirably designed to provide a Schnurle-type scavenging in the cylinder.

The exhaust passages 58 associated with the cylinders of each cylinder bank 54 leads away from the respective cylinder and merge into an exhaust system. The exhaust system discharges engine exhaust from the outboard motor 14 in an conventional manner.

As seen in FIG. 2A, a piston 60 reciprocates within each cylinder bore 56. Connecting rods 62 link the pistons 60 to the crankshaft 17 so that reciprocal linear movement of the piston 60 rotate the crankshaft 17 in a know manner. The crankshaft 17 rotates about the generally vertical axis. The crankshaft 17 include the plurality of space rod journals which lie off-axis from the rotational axis of the crankshaft 17. An end of one the connecting rods 62 is coupled to the rod journal so as to link the corresponding piston 60 to the crankshaft 17 in a know manner.

A cylinder head assembly 64 is affixed to each of the cylinder banks 54 by conventional means. Each cylinder head assembly 64 include the plurality of recesses 66. One recess 66 cooperates with each cylinder bore 56 to close an end of the cylinder. The recess 66 of the cylinder head 64 and the corresponding cylinder bore 56 and piston 60 define a variable volume compression chamber which, at minimum volume, defines the combustion chamber.

Spark plugs 68 are mounted in the cylinder head assembly 64. A spark gap of each spark plug lies generally at the center the corresponding recess 66 of the cylinder head 64; however, the spark plug can have other positions and orientations in the combustion chamber in order to improve stratification of the fuel charge about the spark gap of the spark plug 68, as known in the art. An ignition system fires each spark plug 68, as described below.

On the other end of the cylinder block 52, a skirt of the cylinder block 52 and a crankcase member 70 cooperate to form a crankcase. The crankcase is divided into a plurality of chambers 72, with each chamber 72 communicating with a respective cylinder bore 56 through the corresponding scavenge passages. Adjacent crankcase chamber 72 are sealed from each other by sealing disks 74 provided on the crankshaft 17. The sealing disks 74 desirably are asymmetrically positioned on the throws of the crankshaft 17 and separate the big ends of adjacent connecting rods 62.

An induction system 75 communicates with each crankcase chamber 72. In the illustrated embodiment, the induction system 75 includes a plenum chamber 76 formed within an intake silencer 78. The plenum chamber 76 receives a supply of atmospheric air through an air inlet 77 in the cowling (FIG. 3) and thence through an opening 79 (FIG. 2A) formed in the intake silencer 78. The air is subsequently delivered to a number of adjacent throttle body assemblies 80.

Each throttle body assembly 80 includes a throttle passage 82 in which a butterfly-type throttle valve 84 is supported by a throttle shaft 86. The throttle shaft 86 are controlled by a conventional throttle linkage system (not shown) and operated by a throttle actuator in a known manner to operate the throttle valves 84 in unison.

Each throttle passage 82 is integrally formed within an intake manifold 88 and communicates with a respective intake passage 90 formed within the intake manifold 88. The intake passage 90 in turn communicates directly with a corresponding crankcase chamber 72.

Each intake passage 90 delivers a fuel/air charge to the respective crankcase chamber 72 through a reed-type check valve 92 connected to the intake manifold 88. The reed-type check valve 92 permits the fuel/air charge to flow into the crankcase chamber 72 through the intake passage 90 when the corresponding piston 60 moves toward top dead center, but precludes reverse flow when the piston 60 moves toward bottom dead center to compress the charge delivered to the crankcase chamber 72.

Figure 2B:
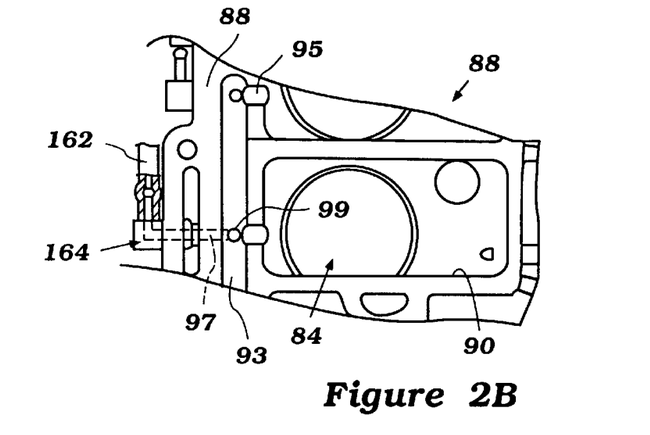
FIG. 2B is an enlarged view of a portion of an intake manifold and a vapor passage of the engine.

As best seen in FIG. 2B, a balance passage 93 interconnects each of the intake passages 90. In the illustrated embodiment, the balance passage 93 is defined by a groove that is formed on one surface of the intake manifold 88. The balance passage 93 extends along the length of the intake manifold 88 from an uppermost intake passage 88 to a lowermost intake passage 88. A mounting plate 94 lies between the intake manifold 88 and the crankcase member 70. The mounting plate 94 covers the open end of the groove to form the balance passage 93. (The balance passage 93 is omitted from FIG. 2A in order to simplify this drawing).

As best seen in FIG. 2B, side runners 95 extend from the balance passage 93 to each intake passage 90. The side runners 95 are also desirably formed by grooves formed in the surface of the intake manifold 88 and closed by the mounting plate 94. The balance passage 93 places each of the intake passages 90 in fluid communication with one another. A suction passage 97 extends into the intake manifold 88 from an outer side and also communicates with the balance passage 93 through a suction hole 99. The suction passage 97 and the suction hole 99 together define a suction port (collectively referred to by reference numeral 97) on the intake manifold 88. In this manner, the balance passage 93 helps to balance the fluid pressure between the intake passages 90 and also functions as a conduit for evenly distributing fuel vapor to each of the intake passages 90, as described below.

The reed-type check valve 92 are mounted to a mounting plate 94 that lies between the intake manifold 88 and the crankcase member 70. Bolts secure these components together.

At least one fuel injector 96 of a fuel injection system 97 injects fuel F into the air stream passing through each intake passage 90. In the illustrated embodiment, the intake manifold 88 includes at least one boss associated with each intake passage 90 on the side of the manifold 88. The boss receives the fuel injector 96 and supports the fuel injector 96 so that its spray axis is generally towards the center of the reed-valve 92 to facilitate uniform mixture of the fuel and air within the fuel/air charge which passes through the reed valve 92.

Figure 3:
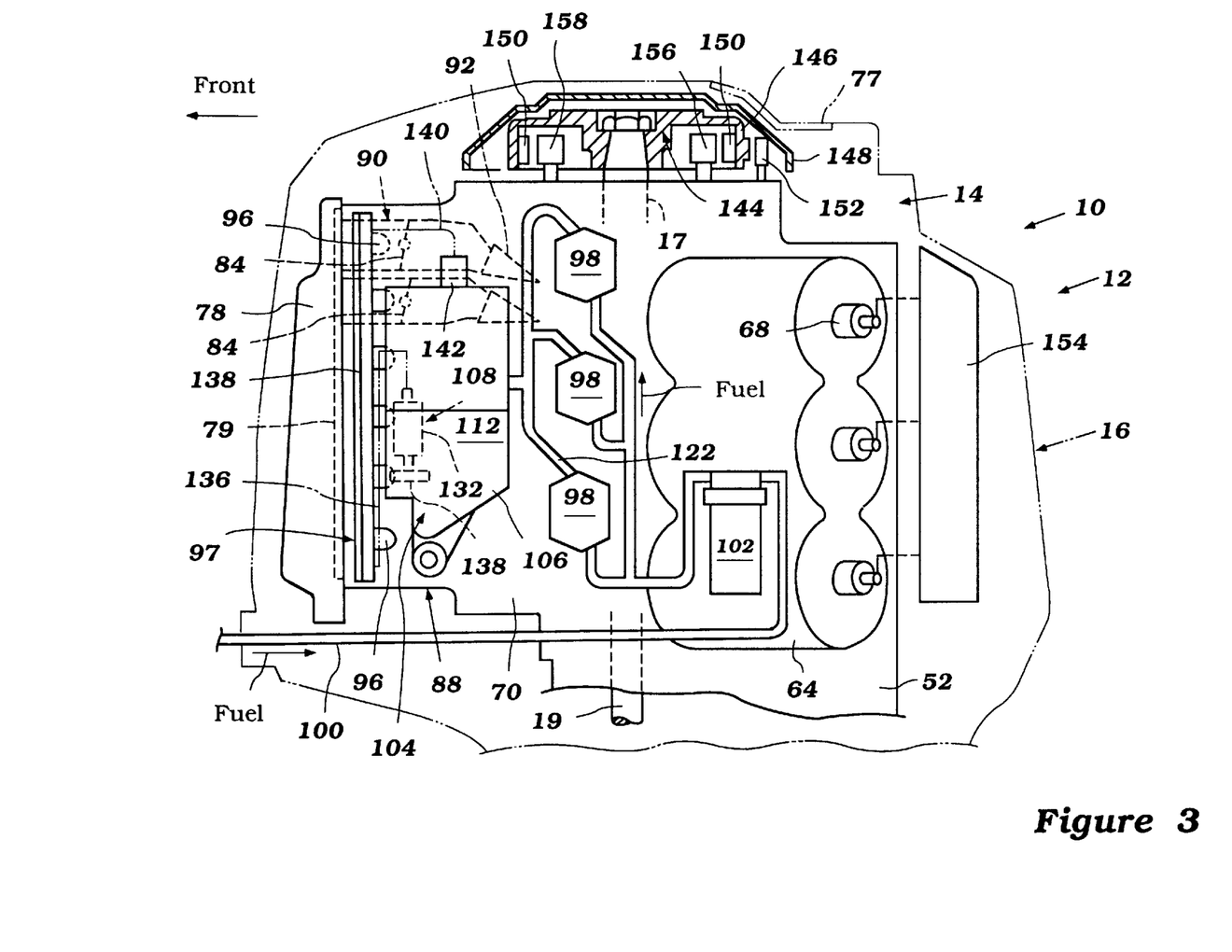
FIG. 3 is partial sectional, a side elevational view of the power head of the outboard motor of FIG. 1, schematically illustrating the fuel supply system, which are configured in accordance with a preferred embodiment of the present invention, on the engine.

With reference to FIGS. 2 and 3, the fuel supply system delivers fuel to each fuel injector 96. The fuel supply system includes the fuel tank 42 which is provided externally of the outboard drive 10, normally within the hull 44 of the watercraft 38.

A plurality of low pressure pumps 98 draw fuel form the external fuel tank 42, through the external fuel line 46 and an internal fuel line 100, and through a fuel filter 102. The fuel filter 102 separates water and other contaminants from the fuel. The low pressure pumps 98 supply fuel to a fuel bowl of a vapor separator assembly 104.

Figure 4:
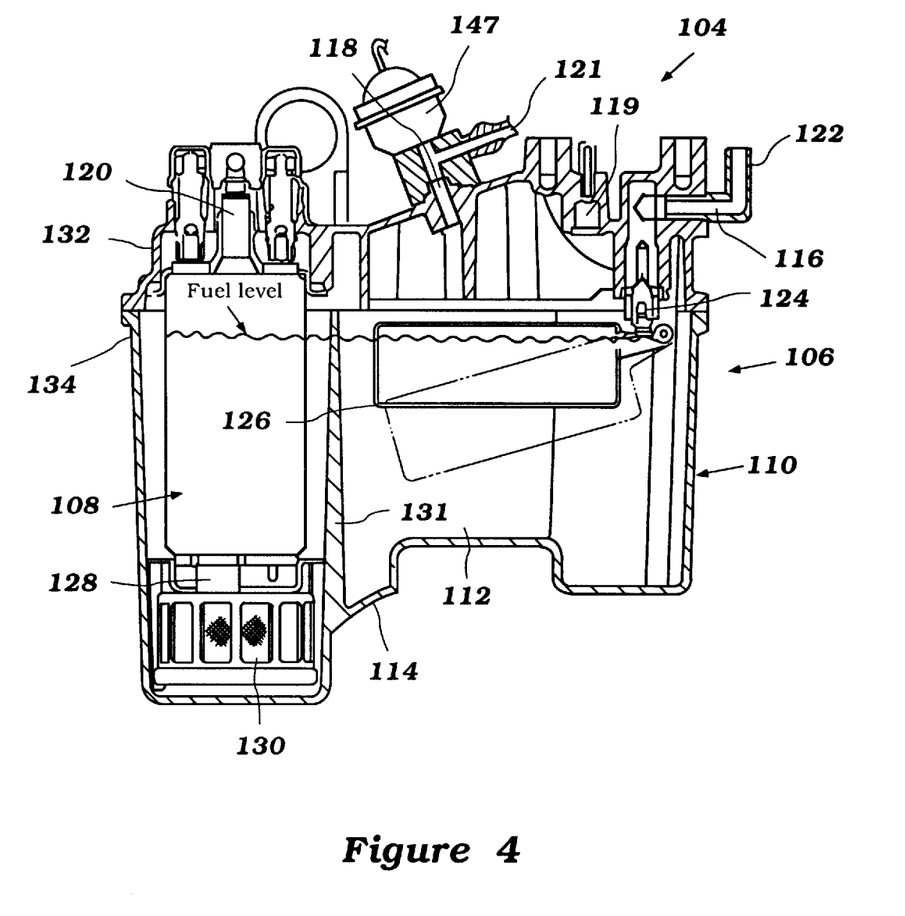
FIG. 4 is a side cross-sectional view of a vapor separator assembly of the fuel supply system of FIG. 3.

As best seen in FIG. 4, the vapor separator assembly 104 includes a vapor separator 106 as well as a high-pressure pump 108 which is positioned within the housing 110 of the vapor separator 106. The housing 110 defines an inner cavity 112 which forms the fuel bowl of the vapor separator 106. The sloped bottom surface 114 funnels the fuel towards an influent port of the pump 108 which is generally positioned at the bottom of the fuel bowl 112.

The housing 110 defines an inlet port 116, a return port 118, a vapor discharge port 119 and outlet port 120. The outlet port directly communicates with an effluent port of the high pressure pump 108. An oil inlet port 121 also communicates with the return port to inject lubricating oil into the fuel. A known oil delivery system communicates with the oil inlet port 121 for this purpose.

Figure 5A:
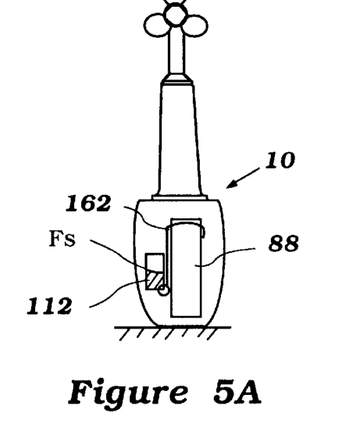
FIG. 5A is a highly schematic rear elevational view of the outboard motor in an inverted position and roughly illustrates a portion of the motor's fuel system, as well as the fuel level within the vapor separator with the engine in this position.

The vapor discharge port 119 is positioned to the side of the inlet port at a position proximate to the upper end of the housing 110. The vapor discharge port 119 communicates with a conduit 121 (FIGS. 3, 5A) leading to one or more of the intake passages 90 of the induction system 75, as described below.

The inlet port 116 connects to a delivery conduit 122 that extends from the low pressure pumps 98. A needle valve 124 operates at a lower end of the intake port 116 to regulate the amount of fuel within the fuel bowl 112. A float 126 within the fuel bowl 112 actuates the needle valve 124. The float includes a buoyant body supported by a pivot arm. The pivot arm is pivotally attached to an inner flange within the housing 110 at a point proximate to the lower end of the housing inlet port 116. The pivot arm also supports the needle valve 124 in a position lying directly beneath a valve seat formed on the lower end of the inlet port 116. Movement of the pivot arm causes the needle valve 124 to open and close the inlet port 116 by either seating against or moving away from the valve seat, depending upon the rotational direction of the pivot arm.

When the fuel bowl 112 contains a low level of fuel, the float 126 lies in a lower position (as represented in phantom lines in FIG. 4). The needle valve 124 is opened with the float 126 in this lowered position and fuel flows from the low pressure pump 98, through the delivery conduit 122 and into the fuel bowl 112 through the inlet port 116. When the fuel bowl 112 contains a preselected amount of fuel, the float 126 rises to a level (FIG. 4) where it causes the needle valve 124 to seat against valve seat at the lower end of the inlet port 116. The preselected amount of fuel desirably corresponds to an amount of fuel that would not fill the fuel tank above the vapor discharge port when the outboard motor 10 is in its tilt-up position.

The high pressure pump 108 draw fuel into its influent port 128 through a fuel strainer 130. The fuel strainer 130 lies generally at the bottom of the fuel bowl 112. Although not illustrated in the particular cross-section take in FIG. 4, the internal wall 131 extends only partially across the fuel bowl 112 with an opening forward to permit fuel to flow from the inlet port 116, through the bowl 112 to the strainer 130.

The pump 108 includes an electric motor formed between a rotatable armature and a plurality of permanent magnet that are spaced about the armature. The armature is carried by a armature shaft which is suitably journalled within the pump housing. Electrical current is supplied to the armature shaft through conventional brushes and a commutator. The coils of the armature desirably are formed of a thinner gauge wire than conventional pump motors in order to increase the number of windings of the armature. In this manner, the motor runs more efficiently (i.e., consumes less power).

As seen in FIG. 4, the vapor separator assembly includes a lid 132 which is removably attached to a base portion 134 of the housing 110 by a plurality of conventional fasteners. A seal desirably extends around the periphery of the housing 110 at the joint between the lid 132 and the housing base 134.

With reference to FIG. 3, the high pressure side of the fuel delivery system supplies fuel to the fuel injectors 96 of the induction system 75. The high pressure pump 108 draws fuel from the fuel bowl 112 of the vapor separator 104 and pushes the fuel through a conduit 136 which is connected to a fuel rail or manifold 138. The pump 108 delivers fuel under high pressure through the conduit 136 to the fuel rail 138. A check valve (not shown) is disposed within the conduit 136 to prevent a back-flow of fuel from the fuel rail 138.

The fuel rail 138 has an elongated shape and is vertically disposed. A lower inlet port of the fuel rail 138 communicates with the conduit 136 which carries fuel from the high pressure pump 108. The inlet port opens into a manifold chamber which extends along the length of the fuel rail 138.

The fuel rail 138 delivers fuel to each fuel injector 96. For this purpose, the manifold chamber of the fuel rail 138 communicates with the plurality of supply ports defined along the length of the fuel rail 148. Each supply port receives an inlet end of the corresponding fuel injector 96 and communicates with an inlet port of the fuel injector 96 to supply the fuel injector 96 with fuel.

Although only schematically illustrated in FIG. 3, a fuel return line 140 extends between an outlet port of the fuel rail 138 and the fuel bowl 112 of the vapor separator 104. The return line 140 completes the flow loop defined by the high pressure side of the fuel supply system to generally maintain a constant flow of fluid through the fuel rail 138. The constant fuel flow through the high pressure side of the fuel delivery system inhibits heat transfer to the fuel and thus reduces fuel vaporization in the fuel rail 138. The vertical orientation also facilitates separation of any fuel vapor which occurs within the fuel rail 138.

As best seen in FIG. 4, a pressure regulator 142 is positioned at the return port 118 of the vapor separator assembly 104. The pressure regulator 142 generally maintains a desired fuel pressure at the injectors 96 (e.g., 50–100 atm). The regulator 142 regulates pressure by dumping excess fuel back to the vapor separator 104, as known in the art.

With reference to FIG. 3, a magneto-generator assembly 144 is attached to the upper end of the crankshaft 17. The magneto-generator assembly 144 includes a rotor that is keyed to the upper end of the crankshaft and is secured thereto by a nut. A flywheel 146 is disposed on the outer periphery of the rotor. A cover 148 covers the magneto-generator assembly 144 within the cowling 16.

The flywheel 146 carries a plurality of permanent magnets 150 on its inner periphery. The magnets 150 cooperate with coils of an ignition system, as described below.

An electronic control unit (ECU) controls ignition timing as well as other components of the engine 14, depending upon the running condition of the engine 14. For this purpose, the ECU includes an ignition controller which receives a signal from a sensor used to determine the angle of the crankshaft 17. In the illustrated embodiment, a pulsar coil 152 is used for this purpose. The pulsar coil 152 produces a signal pulse as the permanent magnets 150 rotate across the coil 152. The ECU uses this signal to determine the specific crankshaft angle at any given time.

The ignition system also includes a capacitor discharge ignition circuit (CDI) 154 which is charged by the output of a conventional charging coil 156. The discharge of a CDI capacitor generates a voltage in an ignition coil associated with each spark plug 68.

The ECU controls the capacitor discharge ignition circuit and the firing of the spark plugs 68. The ECU also controls the speed of the fuel pump 108.

The fuel pump 108 is driven off a generally constant source of direct current (DC) voltage. In the illustrated embodiment, the DC voltage source is a battery.

An alternator is formed between a charging coil 158 and the permanent magnets 150 carried by the flywheel 146. The magnets 150 produce an electrical current within the charging coil 158 as the charging coil 158 the magnetic flux of the magnets 150 which rotate by the coil 158. A rectifier (not shown) converts the alternating current (AC) into a direct current, which is then supplied to the battery. In this manner, the charging coil 158 charges the battery. The battery supplies direct current to the motor of the fuel pump 108, as well as supplies a source of electricity for a variety of other engine and watercraft accessories.

The ECU also communicates with a sensory system in order to control not only ignition timing, but also to control fuel injection timing and duration (i.e., the amount of fuel injected and at what time of the combustion cycle). In the illustrated embodiment, the ECU receives a signal from a fuel/air ratio detector 160 (FIG. 2A) of the sensory system. The detector 160 is mounted to the side of the cylinder block 52 and communicates with the uppermost cylinder 56*a*. The ECU uses this information to adjust the amount of fuel injected into the cylinders and the opening degree of the throttle valves 84.

As best seen in FIG. 3, the vapor separator is mounted on the other side of the engine 14, specifically on the port side (i.e., left side) of the intake manifold 88 beneath the magneto-flywheel assembly 144 and near the fuel injectors 96. The vapor separator 104 separates fuel vapor and other gases from the liquid fuel within the fuel tank 112. Gaseous vapor in the vapor separator 104 desirably is delivered to intake passages 90 to be burnt with the formed fuel/air charge. For this purpose, a discharge conduit 162 extends between the vapor discharge port 119 and a fitting 164 (FIG. 2B) on the intake manifold 88 that communicates with the suction port 97. The discharge conduit 162 also connects the balance passage 93 to the pressure regulator 142 to provide a reference pressure.

As will be explained in connection with FIGS. 5A through 9B, the vapor suction port, vapor discharge port 119, and the vapor discharge line 162 are arranged on the engine 14 to inhibit liquid fuel ingress into the intake manifold 88 through the vapor discharge line 162 when the outboard motor 10 is placed in a position outside of its normal range of operating positions (i.e., other than an upright, trimmed, or full tilt-up position). For this purpose, the vapor discharge port 119 and the vapor discharge line 162 are arranged to lie above a fuel level FS of the fuel within the fuel tank 112 regardless of the orientation of the outboard motor 10.

In the illustrated embodiment, the vapor discharge port 119 is arranged on the vapor separator 104 to at least in part accomplish this. The vapor discharge port 119 is located on the upper lid 132 of the vapor separator 104 at a point toward an aft end of the vapor separator 104 (see FIG. 6B).

The vapor discharge port 119 also lies to one side of the vapor suction port 97. For this purpose, in the illustrated embodiment, the vapor discharge port 119 lies on one side of the engine (e.g., the port side) and the vapor suction port 97 lies on the other side (e.g., the starboard side). The discharge port 119 also desirably lies on a portion of the vapor separator 104 farthest from a central plane C (see FIG. 7B) of the engine 14 which, in the illustrated embodiment, bifurcates the V-shape of the cylinder banks 64 and contains the axis about which the crankshaft 17 rotates. For this purpose, the housing 110 of the vapor separator 104 includes an outwardly sloping outer wall 164. The discharge port 119 is desirably positioned next to the outer wall 164 of the vapor separator 104.

In this position, the discharge port 119 lies above, behind and to the side of the suction port 97, which in the illustrated embodiment, is arranged on the lower, starboard (i.e., right) side of the engine 14. These relative positions between the suction port 97 on the engine 14 and the vapor discharge port 119 on the vapor separator 104 helps inhibit or curb the flow of liquid fuel from the fuel tank 112 into the intake manifold 88 through the discharge line 162 and the balance passage 93.

The discharge line 162 also is arranged on the engine 14 to accomplish this purpose. At least a portion of the discharge line 162 extends toward a side of the engine that is opposite of the side on which the discharge port 119 is placed. At least a portion of the discharge line 162 also extends toward the an end of the engine 14 (either fore or aft) that is opposite of the end toward which the discharge port 119 is located. And at least a portion of the discharge line 162 extends toward an extremity of the engine 14 (either an upper or a lower end) that is opposite of the extremity toward which the discharge port 119 is located.

In the illustrated embodiment, the discharge line 162 extends upward from the discharge port 116 and then turns outward for a short distance before turning toward the port side of the engine to which the vapor separator 104 is attached. At this point the line also extends along the side of the engine 14, toward its starboard side and front bottom end. The line 162 wraps around the lower end of the intake manifold 88 generally across the front side of the crankcase member 70. The discharge line 162 thence turns upward on the starboard side of the engine 14 and connects to fitting 164. The fitting 164, as mentioned above, communicates with the suction passage 97 of the intake manifold 88 that lies near the penultimate intake passage 90 in the illustrated embodiment.

This arrangement of the discharge port 119, the discharge conduit 162 and suction port 97 helps curb liquid fuel flow from the internal fuel tank 112. The reasons for this is explained in connection with FIGS. 5A through 9B, which illustrate the outboard motor 10 in a variety of extreme positions relative to its normal operating positions.

Figure 5B:
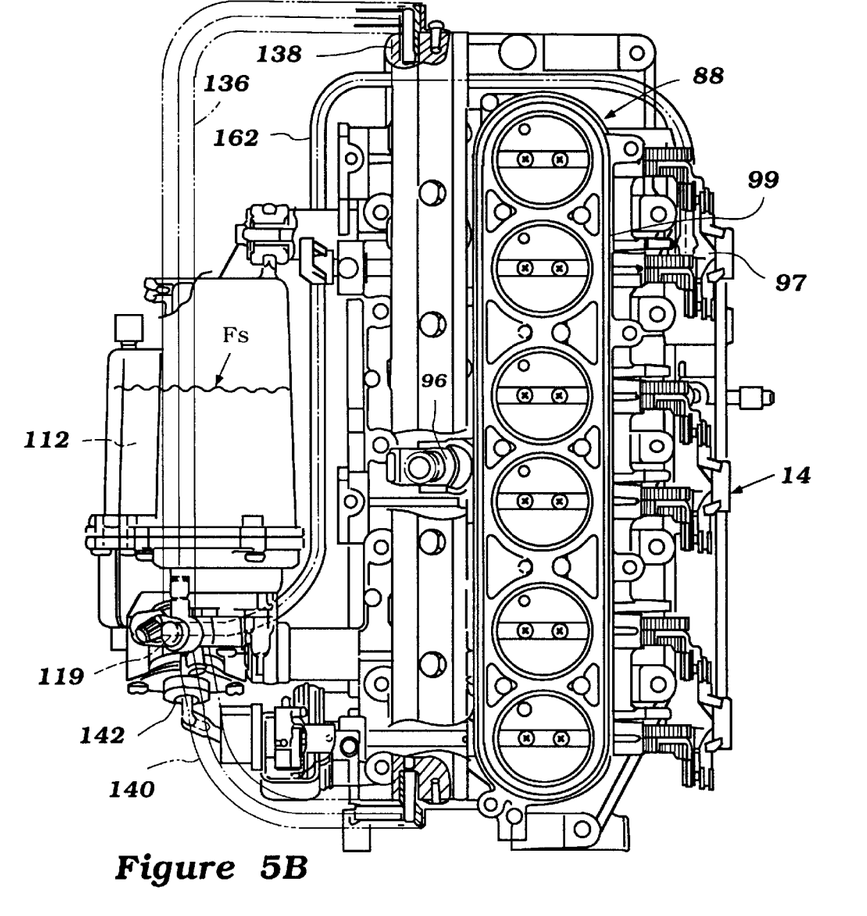
FIG. 5B is an enlarged and detailed view of a portion of the engine and fuel system illustrated in FIG. 5A.

As seen in FIG. 5B, although the vapor discharge port 119 lies beneath the fuel level FS with the outboard motor 10 in an inverted position (see FIG. 5A), the portion of the discharge line 162 that extends toward the front end of the engine 14 lies above (i.e., at a higher level than) the fuel level FS with the outboard motor in this position. As a result, liquid fuel does not drain from the fuel tank 112 into the intake manifold 88 when the outboard motor is inverted.

Figure 6A:
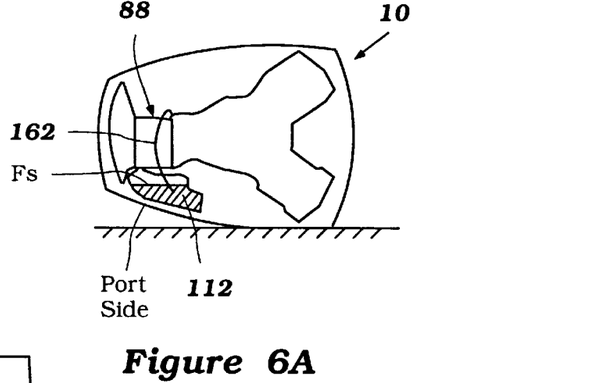
FIG. 6A is a highly schematic view of a top of the outboard motor with the outboard motor leaned over on its port side and roughly illustrates a portion of the fuel system and the fuel level within the vapor separator with the engine in this position.
Figure 6B:
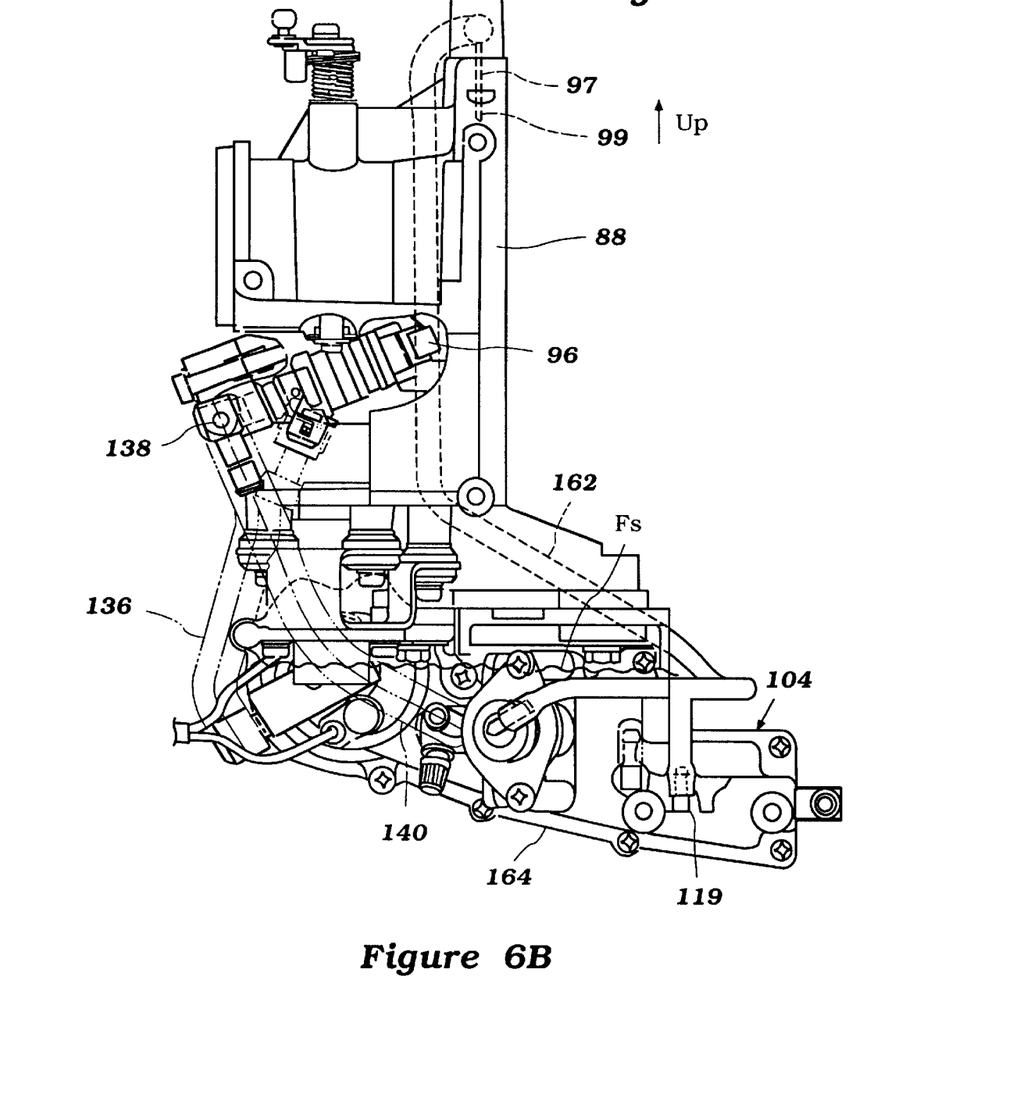
FIG. 6B is an enlarged and detailed view of a portion of the engine and fuel system illustrated in FIG. 6A.

As seen in FIG. 6B, liquid fuel also does not drain from the fuel tank 112 into the intake manifold 88 through the discharge conduit 162 when the outboard motor is laid on its port side (see FIG. 6A). A portion of the discharge line 162 that extends toward the starboard side of the engine 14 lies above the fuel level FS with the outboard motor in this position. Liquid fuel thus does not drain from the fuel tank 112 through the discharge conduit 162 with the outboard motor 10 in this position.

Figure 7A:
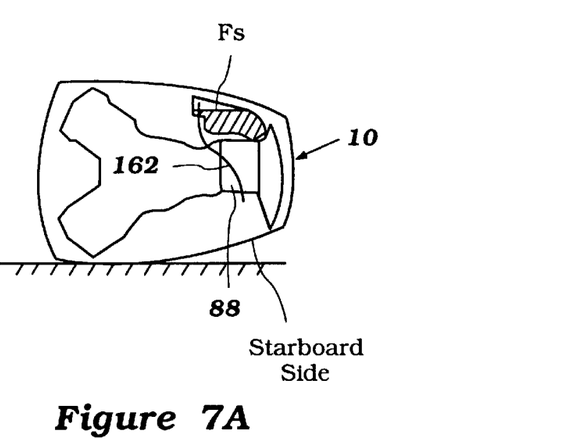
FIG. 7A is a highly schematic view of a top of the outboard motor with the outboard motor leaned over on its starboard side and roughly illustrates a portion of the fuel system and the fuel level within the vapor separator with the engine in this position.
Figure 7B:
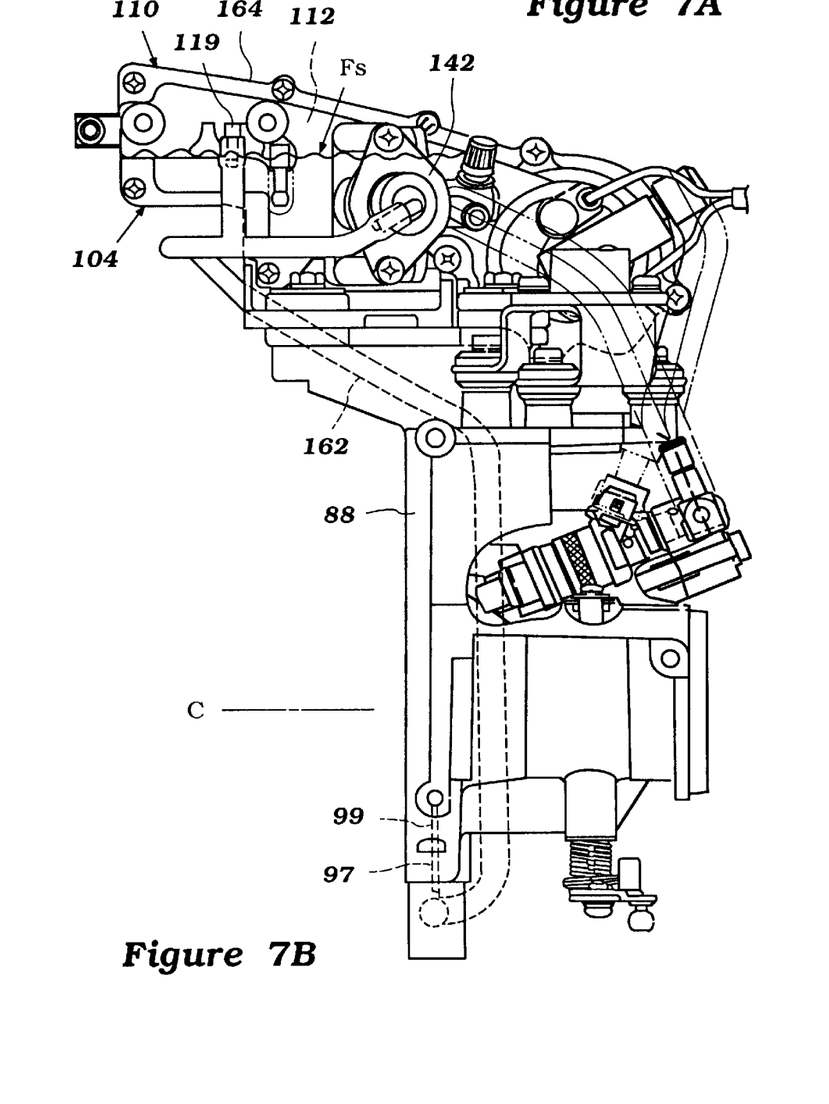
FIG. 7B is an enlarged and detailed view of a portion of the engine and fuel system illustrated in FIG. 7A.

The position of the discharge port 119 lies higher than the fuel level FS when the outboard motor 10 is laid on its starboard side (see FIG. 7A). As seen in FIG. 7B, the position of the discharge port 119 next to the outer wall 164 and at a point on the vapor separator 104 generally farthest from the central plane C of the engine 14 helps insures that the discharge port 119 lies above the fuel level FS when the outboard motor 10 is in this position.

Figures 8A, 8B:
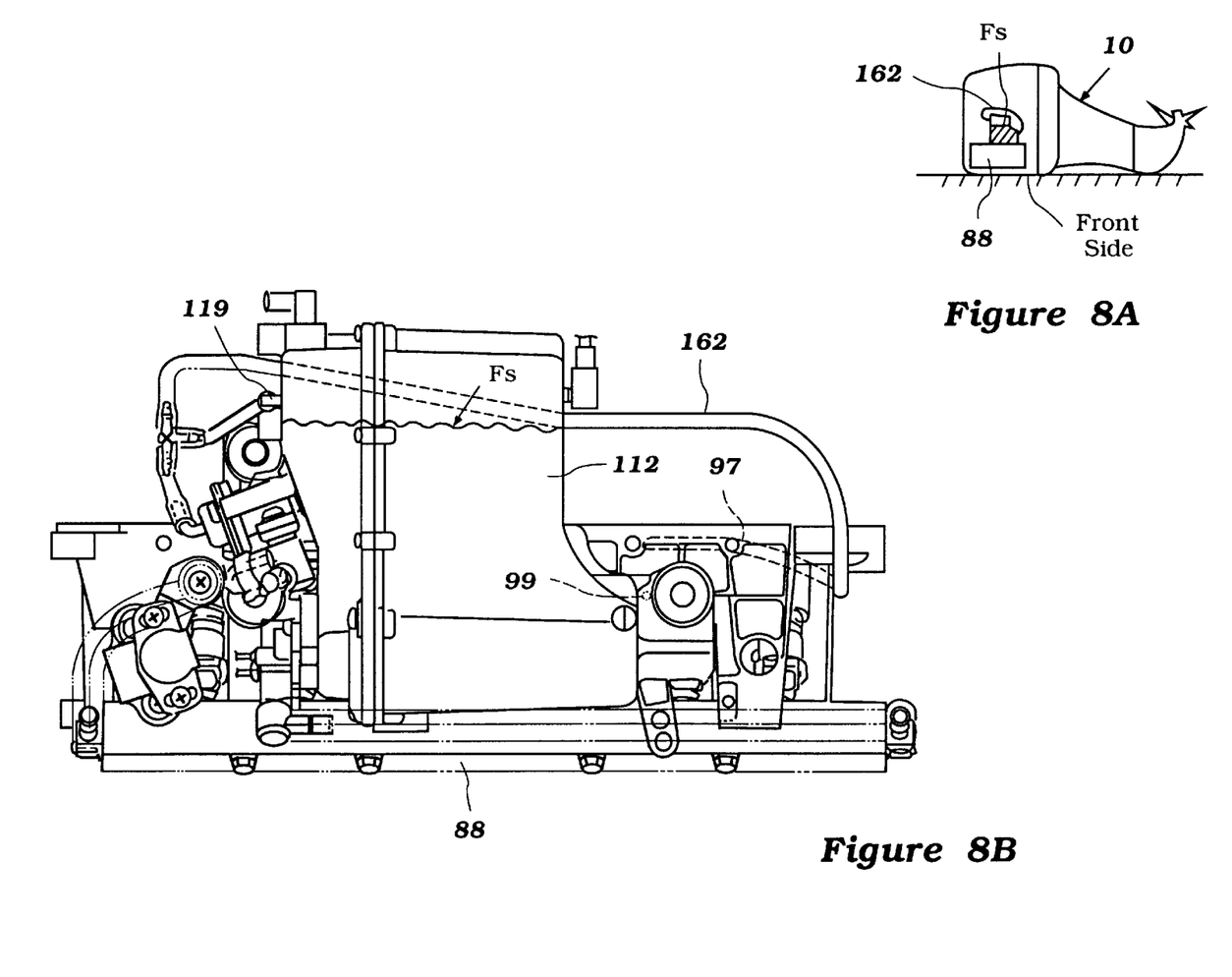
FIG. 8A is a highly schematic view of the port side of the outboard motor with the outboard motor lying in a front down position, and roughly illustrates a portion of the fuel system and the fuel level within the vapor separator with the engine in this position.
FIG. 8B is an enlarged and detailed view of a portion of the engine and fuel system illustrated in FIG. 8A.

FIG. 8A illustrated the outboard motor 10 in a front down position. Both the discharge port 119 and a portion of the discharge line 162 immediately adjacent to the discharge port 119 lie above the fuel level FS with the outboard motor 10 in this position. Liquid fuel thus does not enter the discharge line 162.

Figure 9A:
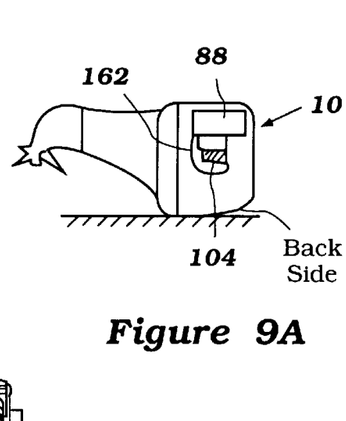
FIG. 9A is a highly schematic view of the port side of the outboard motor with the outboard motor lying in a front up position, and roughly illustrates a portion of the fuel system and the fuel level within the vapor separator with the engine in this position.
Figure 9B:
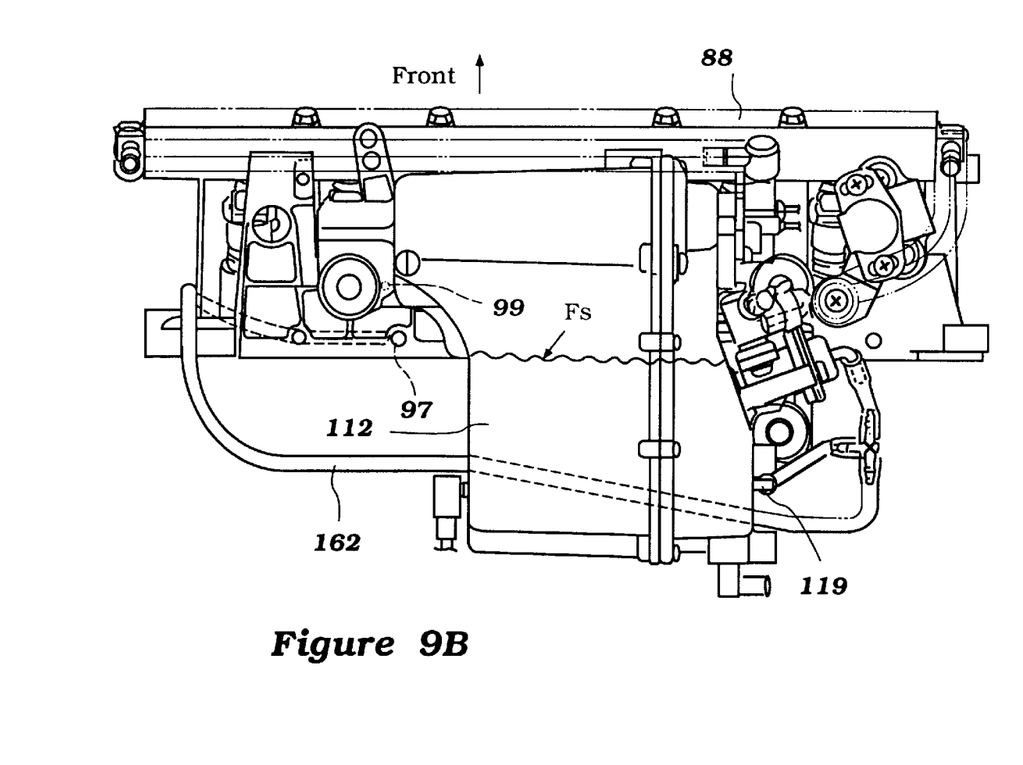
FIG. 9B is an enlarged and detailed view of a portion of the engine and fuel system illustrated in FIG. 9A.

When the outboard motor 10 is in a face up position, as shown in FIG. 9A, the portion of the discharge line 162 that extends forward and about the front end of the engine 14 lies above the fuel level FS (FIG. 9B) with the outboard motor in this position, even through the discharge port 119 is submerged. The suction port 97 in this embodiment also lies above the fuel level FS, as seen in FIG. 9B. Again, the relative positions of the vapor discharge line 162, the vapor separator 104 and its vapor discharge port 119 and the suction port 97 inhibits and curb liquid fuel flow from the fuel tank 112 into the intake manifold 88 when the outboard motor 10 is in this face up position, as well as in a variety of other extreme positions, as illustrated by the above discussion.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. An outboard motor comprising an engine having an output shaft that rotates about a rotational axis, the output shaft driving a propulsion device located generally below the engine with the outboard motor in an upright position, the engine additionally including an intake passage and a vapor suction hole that communicates with the intake passage, a fuel tank, a fuel level control mechanism that establishes a maximum level of fuel within the fuel tank, a vapor discharge port on the fuel tank that lies above the maximum fuel level with the outboard motor in the upright position, and a vapor discharge line connecting the vapor suction hole on the engine to the vapor discharge port on the fuel tank, said vapor discharge port and said vapor discharge line being arranged relative to the engine such that at least a portion of either the vapor discharge line or the vapor discharge port lies above the fuel level within the fuel tank regardless of the orientation of the outboard motor.

2. An outboard motor as in claim 1, wherein said engine includes fore and aft ends, and the vapor discharge port is located toward one of the fore and aft ends and at least a portion of the vapor discharge line extends toward the other of the fore and aft ends.

3. An outboard motor as in claim 1, wherein the engine includes port and starboard sides, and the fuel tank is located on one of the port and starboard sides, and at least a portion of the vapor discharge line extends toward the other of the port and starboard sides.

4. An outboard motor as in claim 1, wherein the engine includes upper and lower ends, and the vapor discharge port is located toward one of the upper and lower ends, and at least a portion of the vapor discharge line extends toward the other of the upper and lower ends.

5. An outboard motor as in claim 1, wherein the engine includes a pair of side surfaces arranged on opposite sides of a central plane of the engine, and the vapor discharge port is located on an outer portion of the fuel tank that is distanced from the central plane, and the vapor suction port is arranged on opposite side of the engine central plane, below and in front of the vapor discharge port.

6. An outboard motor as in claim 5, wherein the vapor discharge port is located on a portion of the fuel tank that is farthest from the central plane.

7. An outboard motor as in claim 5, wherein the fuel tank includes an inlet port, and the vapor discharge port is located forward of the inlet port.

8. An outboard motor as in claim 7, wherein the fuel level control mechanism comprises a needle valve actuated by a float positioned within the fuel tank.

9. An outboard motor as in claim 1, wherein the fuel tank forms a portion of a vapor separator assembly which includes a fuel pump.

10. An outboard motor comprising an engine being arranged within the outboard motor to have port and starboard sides, fore and aft ends and upper and lower ends, the engine including an intake passage and a vapor suction hole that communicates with the intake passage, and a fuel system supplying fuel to the engine, the fuel system including an internal fuel tank positioned within the outboard motor, the fuel tank including a vapor discharge hole, the vapor discharge hole being positioned to lie above and behind the vapor suction hole, and to one side of vapor suction hole.

11. An outboard motor as in claim 10, wherein the vapor discharge hole generally lies on one side of the engine and the vapor suction hole generally lies on the other side of the engine.

12. An outboard motor as in claim 10, wherein the engine includes a central plane extending in a fore aft direction, and the vapor discharge port lies on a portion of the fuel tank that is farthest from the central plane of the engine.

13. An outboard motor as in claim 10, wherein the engine includes an output shaft that is arranged to rotates about a generally vertical axis.

14. An outboard motor as in claim 10, wherein the fuel system includes at least one fuel injector.

15. An outboard motor comprising an engine having at least one variable volume combustion chamber formed in part by a movable member that is connected to an output shaft of the engine, the output shaft being arranged to rotates about a generally vertical rotational axis, the engine having first and second ends, which are generally diametrically opposed relative to the rotational axis, and first and second sides which generally lie on diametrically opposite sides of the rotational axis and between the first and second ends, the sides and ends being generally defined between upper and lower extremities of the engine, at least one intake passage communicating with the combustion chamber, a vapor suction port communicating with at least the one intake passage, and a fuel system supplying fuel to the engine, the fuel system including a vapor separator having an inner side arranged near the engine first side, an outer side distanced from the engine first side, a first end positioned toward the engine first end, and a second end positioned toward the engine second end, the sides and ends of the vapor separator being defined between upper and lower portions of the vapor separator, a vapor discharge port being located on the upper portion of the vapor separator toward the first end and near the outer side of the vapor separator, and a vapor delivery line extending between the vapor discharge port on the vapor separator and the vapor suction port on the engine, the vapor delivery line being arranged on the engine such that a portion of the line extends toward the second side of the engine, another portion of the line extends toward the second end of the engine, and an additional portion of the line extends toward the lower extremity of the engine.

16. An outboard motor as in claim 15, wherein the vapor suction port lies toward one end of the engine's first and second ends, and the vapor discharge port lies toward the other end of the engine's first and second ends.

17. An outboard motor as in claim 15, wherein the vapor suction port lies toward one extremity of engine's upper and lower extremities, and the vapor discharge port lies toward the other extremity of the engine's upper and lower extremities.

18. An outboard motor as in claim 15, wherein the engine has a central plane positioned between the first and second sides, and the vapor suction port lies on one side of the central plane and the vapor discharge port lies on the other side of the central plane.

19. An outboard motor as in claim 15, wherein the vapor suction port is spaced from the vapor discharge port in a direction extending between the sides of the engine.

20. An outboard motor as in claim 15, wherein the fuel system comprises at least one fuel injector.

* * * * *